(12) United States Patent
Hakon et al.

(10) Patent No.: US 9,309,941 B2
(45) Date of Patent: *Apr. 12, 2016

(54) LIQUID COOLED BRAKE WITH SUPPORT COLUMNS

(71) Applicant: Warner Electric Technology LLC, Braintree, MA (US)

(72) Inventors: Ian Nigel Hakon, Bedfordshire (GB); Guy Robert Mason, Cambridge (GB); Ryan Shey Davis, Waukesha, WI (US); Richard Wayne Mayberry, Wichita Falls, TX (US)

(73) Assignee: Warner Electric Technology LLC, Braintree, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,477

(22) Filed: Jul. 15, 2014

(65) Prior Publication Data

US 2014/0318904 A1    Oct. 30, 2014

Related U.S. Application Data

(63) Continuation of application No. 11/670,698, filed on Feb. 2, 2007, now Pat. No. 8,776,955.

(51) Int. Cl.
*F16D 55/36* (2006.01)
*F16D 65/853* (2006.01)
(Continued)

(52) U.S. Cl.
CPC ............ *F16D 65/853* (2013.01); *F16D 55/36* (2013.01); *F16D 55/42* (2013.01); *F16D 65/847* (2013.01); *F16D 2065/784* (2013.01); *F16D 2121/02* (2013.01); *F16D 2125/14* (2013.01)

(58) Field of Classification Search
CPC ............ F16D 13/72; F16D 2065/1328; F16D 2300/02; F16D 2500/316
USPC .......... 188/264 D, 264 AA, 264 A, 170, 71.5, 188/71.4, 71.6
See application file for complete search history.

(56) References Cited

U.S. PATENT DOCUMENTS 2,655,236 A   10/1953  Bachman
3,031,528 A    8/1962  Rogers
(Continued)

OTHER PUBLICATIONS

International Search Report issued in International (PCT) patent application PCT/US2008/052265 (Jun. 2, 2008).
(Continued)

*Primary Examiner* — Robert A Siconolfi
*Assistant Examiner* — Mahbubur Rashid
(74) *Attorney, Agent, or Firm* — Reising Ethington P.C.

(57) ABSTRACT

A liquid cooled brake is provided having an improved housing that provides strong yet lightweight structural support. The brake includes end plates disposed about a driven shaft and axially spaced from one another. A plurality of axially extending pins connect the end plates. A friction plate is coupled to the driven shaft for rotation therewith and is axially movable relative to the driven shaft. Another friction plate defines a fluid jacket and is coupled to the pins. The friction plate is fixed against rotation, but axially movable, relative to the pins. A pressure plate is configured for selective movement towards the friction plates. Support columns are disposed radially outwardly of each pin and fixed to the end plates The support columns prevent undue strain on the pins. Ventilated guards may also be located between each pair of columns to limit access to internal working components of the brake.

19 Claims, 3 Drawing Sheets

(51) Int. Cl.
  *F16D 55/42*    (2006.01)
  *F16D 65/847*    (2006.01)
  *F16D 65/78*    (2006.01)
  *F16D 121/02*    (2012.01)
  *F16D 125/14*    (2012.01)

(56) References Cited

U.S. PATENT DOCUMENTS

| | | | |
|---|---|---|---|
| 3,572,477 A | | 3/1971 | Ewart |
| 3,599,760 A | | 8/1971 | Moss |
| 3,830,345 A | | 8/1974 | Boyles |
| 3,862,678 A | | 1/1975 | Collins |
| 3,999,634 A | | 12/1976 | Howell |
| 4,017,123 A | | 4/1977 | Horner et al. |
| 4,084,857 A | | 4/1978 | VanderVeen |
| 4,102,438 A | | 7/1978 | Rancourt |
| 4,383,594 A | * | 5/1983 | Correll et al. ............... 188/71.5 |
| 4,609,076 A | | 9/1986 | Collins et al. |
| 4,977,991 A | * | 12/1990 | Mahoney .................. 192/70.19 |
| 5,851,056 A | | 12/1998 | Hyde |
| 6,029,782 A | | 2/2000 | Chojecki et al. |
| 6,318,511 B1 | | 11/2001 | Clement et al. |
| 6,405,837 B1 | | 6/2002 | Muramoto |
| 6,491,139 B1 | | 12/2002 | Budica |
| 6,516,924 B1 | | 2/2003 | Michael et al. |
| 6,609,601 B2 | * | 8/2003 | Vogt ........................... 192/70.19 |
| 7,051,845 B2 | | 5/2006 | Thorp et al. |
| 7,055,657 B2 | | 6/2006 | Aschauer |
| 2005/0264090 A1 | * | 12/2005 | Kaczynski et al. ............ 301/6.1 |
| 2007/0095619 A1 | | 5/2007 | Mayberry et al. |
| 2007/0095621 A1 | | 5/2007 | McConkie et al. |
| 2007/0095622 A1 | | 5/2007 | Mayberry et al. |
| 2007/0236076 A1 | * | 10/2007 | Tong et al. .................. 301/6.91 |

OTHER PUBLICATIONS

Written Opinion issued in international (PCT) patent application PCT/US2008/052265 (Jun. 2, 2008).

* cited by examiner

LIQUID COOLED BRAKE WITH SUPPORT COLUMNS

This application is a continuation application of, and claims priority to, U.S. patent application Ser. No. 11/670,698 filed Feb. 2, 2007, now U.S. Pat. No. 8,776,955, the entire disclosure of which is incorporated herein by reference.

BACKGROUND OF THE INVENTION

1. Field of the Invention

This invention relates to liquid cooled brakes and, more particularly, to a liquid cooled brake in which support columns are used to provide a lightweight yet strong supporting housing.

2. Disclosure of Related Art

A conventional liquid cooled disc brake includes a stationary housing disposed about a rotating shaft. A plurality of friction plates are coupled to the housing and fixed against rotation relative to the housing, but axially moveable relative to the housing. These friction plates define fluid jackets through which cooling liquids are circulated. Another plurality of friction plates are coupled to the shaft for rotation therewith and are axially movable relative to the shaft. The plates coupled to the shaft are interleaved with the plates coupled to the housing. A brake actuator is disposed at one axial end of the brake and applies a force in an axial direction to bring the plates into contact with one another.

The housing for conventional liquid cooled brakes typically includes one or more rings encircling the friction plates. These rings are generally solid, relatively heavy and must be customized to the diameter of the brake. Other conventional liquid cooled brakes have eliminated the rings and have instead used a plurality of pins extending between end plates of the brake. This arrangement is disadvantageous, however, because the pins are required to provide both structural support to the brake and absorb braking forces during operation of the brake creating undue strain on the pins.

The inventors herein have recognized a need for brake that will minimize and/or eliminate one or more of the above-identified deficiencies.

SUMMARY OF THE INVENTION

The present invention provides a liquid cooled brake having an improved structural support.

A brake in accordance with the present invention includes first and second end plates disposed about a driven shaft. The driven shaft rotates about a rotational axis and the first and second end plates are axially spaced from one another. A plurality of axially extending pins connect the first and second end plates. A first friction plate is coupled to the driven shaft for rotation therewith and is axially movable relative to the driven shaft. A second friction plate is coupled to the plurality of pins. The second friction plate is fixed against rotation relative to the plurality of pins, but is axially movable relative to the plurality of pins. The second friction plate defines a fluid jacket configured for passage of a fluid. A pressure plate is configured for selective movement in a first axial direction towards the first and second friction plates. A first support column is disposed radially outwardly of a first pin of the plurality of pins and is fixed at first and second ends to the first and second end plates, respectively. Additional support columns may be disposed radially outwardly of additional corresponding pins of the plurality of pins and fixed to the first and second end plates.

A brake in accordance with the present invention represents a significant improvement relative to conventional liquid cooled brakes. In particular, the use of support columns between the end plates of the inventive brake reduces strain on the pins and provides a housing with improved structural support that is strong, yet lightweight and scalable.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
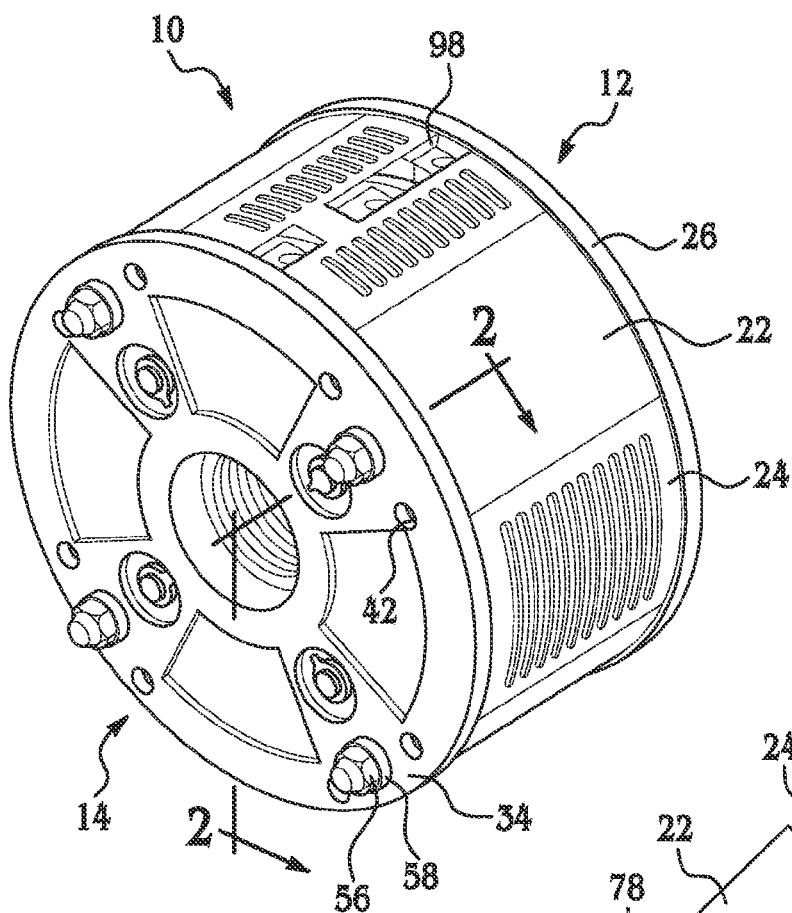
FIG. 1 is a perspective view of a brake in accordance with the present invention.
Figure 2:
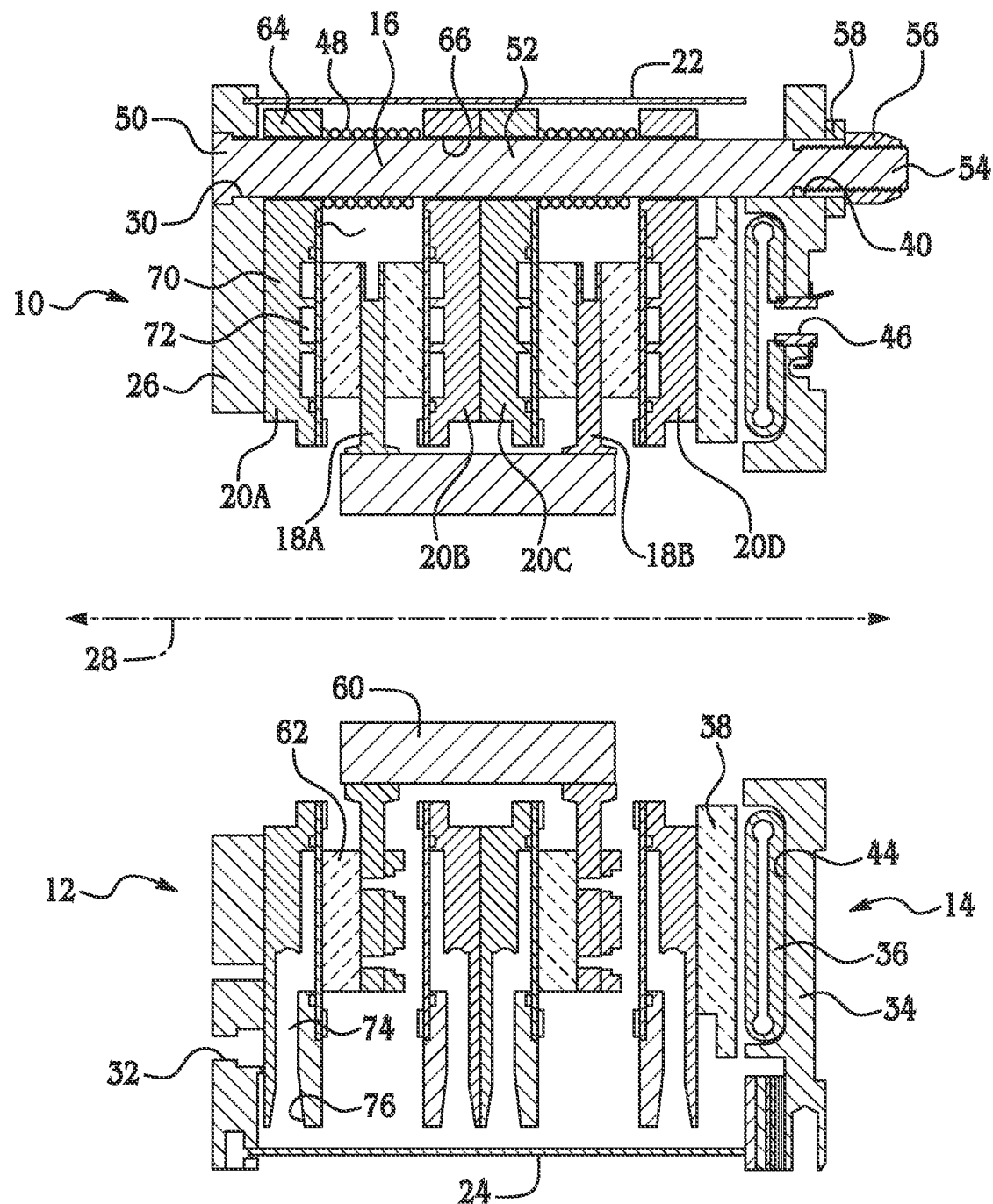
FIG. 2 is a cross-sectional view of the brake of FIG. 1 taken along lines 2-2.
Figure 3:
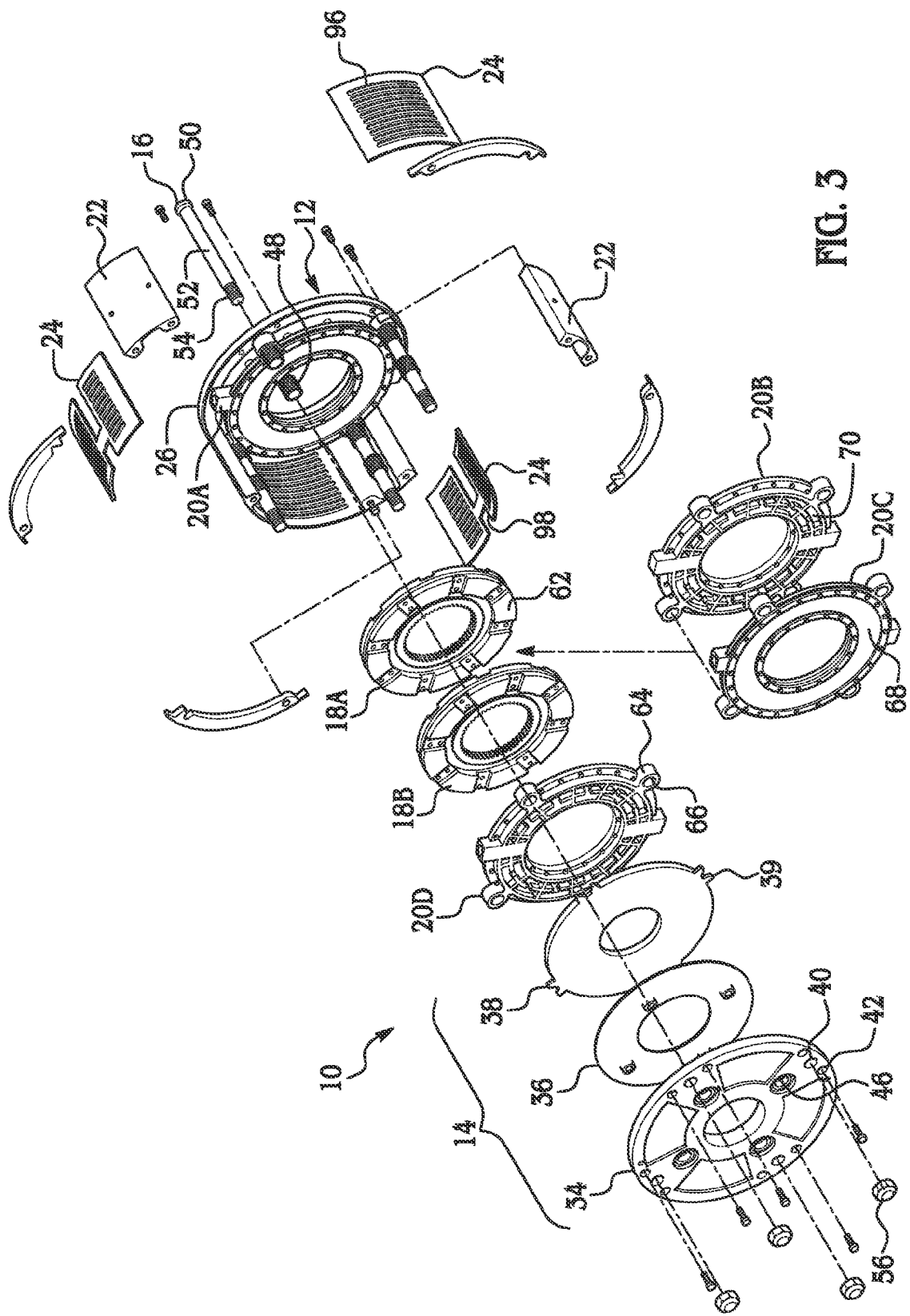
FIG. 3 is an exploded perspective view of the brake of FIG. 1.

Referring now to the drawings wherein like reference numerals are used to identify identical components in the various views, FIG. 1 illustrates a brake 10 in accordance with the present invention. Brake 10 may be provided for heavy duty industrial use (e.g., on oil drilling equipment). Referring to FIGS. 2-3, brake 10 includes end cap assemblies 12, 14, pins 16, and two sets of friction plates 18A-B, 20A-D. Referring to FIGS. 1 and 3, in accordance with the invention brake 10 also includes support columns 22 and guards 24.

Referring to FIG. 2, end cap assembly 12 encloses one end of brake 10 and includes an end plate 26. Plate 26 may be made from conventional metals and metal alloys. Plate 26 is annular and is disposed about a rotational axis 28 of a drive shaft (not shown). Plate 26 may include a plurality of stepped diameter bores 30 each configured to receive a corresponding pin 16. Plate 26 may also define a plurality of bores 32 configured to receive fasteners (not shown) used to mount brake 10 to another object.

End cap assembly 14 encloses an opposite axial end of brake 10 relative to end cap assembly 12 and provides support for a brake actuator. Assembly 14 includes an end plate 34, an expandable bladder 36 and a pressure plate 38.

End plate 34 is annular in construction and disposed about axis 28. Plate 34 may be made from conventional metal and metal alloys. Plate 34 includes a plurality of bores 40 aligned with bores 30 in plate 26 and configured to receive pins 16. Referring to FIGS. 1 and 3, plate 34 may also define bores 42 on either side of each bore 40 that are aligned with corresponding bores (not shown) in plate 26 for a purpose described hereinbelow. Referring again to FIG. 2, plate 34 also defines an annular recess 44 configured to receive bladder 36 and one or more axial bores 46 through which pneumatic or hydraulic fluid is provided to bladder 36 via a hose (not shown).

Bladder 36 bears against plate 38 to move plate 38 in an axial direction (to the left in FIG. 2). Bladder 36 is conventional in the art and is disposed within recess 44 of end plate 34. When fluid is supplied to bladder 36, bladder 36 expands and urges pressure plate 38 in an axial direction to compress, and cause engagement of, friction plates 18A-B, 20A-D.

When fluid pressure is removed from bladder 36, springs 48 disposed about pins 16 bias friction plates 20A-B and 20C-D away from both one another and friction plates 18A-B towards their original position.

Pressure plate 38 engages friction plate 20D and, when fluid is supplied to bladder 36, urges friction plate 20D in an axial direction (to the left in FIG. 2) to compress friction plates 18A-B, 20A-D. Plate 38 may be made from conventional metals and metal alloys. Plate 38 is annular and disposed about axis 26. Plate 38 is configured to receive pins 16 such that plate 38 is capable of axial movement relative to pins 16, but is prevented from rotating relative to pins 16. In particular, and with reference to FIG. 3, plate 38 may include radially outwardly extending flanges 39 defining semicircular recesses configured to receive pins 16 to prevent rotation of plate 38.

Referring again to FIG. 2, pins 16 provide a mounting structure for friction plates 20A-D and structural support for brake 10. Pins 16 are conventional in the art. Pins 16 extend axially from end plate 26 to end plate 34 to connect end plates 26, 34. Each pin 16 may include a head 50 at one end that abuts against a shoulder formed in a corresponding bore 30 of end plate 26. Each pin 16 further includes a shank 52 that terminates in a threaded end 54. The shank 52 of each pin 16 is configured to be received within aligned apertures in friction plates 20A-D and also supports springs 48 between friction plates 20A-B and between friction plates 20C-D. Nuts 56 and washers 58 may be disposed about the end 54 of each pin 16 to establish an initial axial position of end plate assemblies 12, 14 and friction plates 18A-B, 20A-D. In the illustrated embodiment, four pins 16 are provided. It should be understood, however, that the number of pins 16 may vary depending on the specific requirements for the brake.

Friction plates 18A-B are provided to transfer braking torque from friction plates 20A-D to the driven shaft (not shown). Friction plates 18A-B may be made from conventional metals and metal alloys such as iron and copper. Plates 18A-B are coupled to a hub 60 fixed to the driven shaft (or directly to the shaft) through the use of spline teeth on a radially inner surface of plates 18A-B and a radially outer surface of hub 60 (or the shaft), respectively. Plates 18A-B may include a conventional friction material 62 connected to each side of plates 18A-B by fasteners (not shown) such as bolts or screws. Although only two plates 18A-B are shown in the illustrated embodiment, it should be understood that additional plates 18 could be interleaved with additional plates 20 to increase braking torque.

Friction plates 20A-D are provided to transmit a braking torque to friction plates 18A-B and the driven shaft upon engagement of plates 18A-B, 20A-D. Referring to FIG. 3, friction plates 20A-D have a plurality of circumferentially spaced radially outwardly projecting tabs 64 with apertures 66 configured to receive pins 16. In this manner, plates 20A-D are fixed against rotation relative to pins 16, but are axially movable relative to pins 16. Referring again to FIG. 2, each of friction plates 20A-D includes one or more cover plates 68 and a fluid jacket 70. Plates 68 are conventional in the art and may be made from a variety of conventional metals and metal alloys including iron or copper. Plates 68 close fluid passages defined in fluid jacket 70 and may be connected to fluid jacket 70 using fasteners (not shown) such as bolts or screws or pins. Fluid jackets 70 are provided to allow for circulation of a cooling liquid such as water or another conventional liquid within brake 10 to allow for transfer of frictional heat generated within brake 10. Jackets 70 are conventional in the art and include an annular body that defines a fluid manifold through which liquid circulates. Jackets 70 may define a plurality of concentric flow passages 72 and radial flow passages 74 that place concentric passages 72 in fluid communication with fluid inlets 76 and outlets (not shown). In the illustrate embodiment, friction plate 20A is disposed at one axial end of brake 10, friction plate 20D is disposed at an opposite axial end of brake 10 and friction plates 20B-C are arranged back to back intermediate plates 20A, D. In accordance with one aspect of the present invention, friction plates 20A-D are identical in construction allowing ease of assembly and manufacture. Although four friction plates 20A-D are shown in the illustrated embodiment, it should be readily understood that additional plates 20 could be interleaved with plates 18 and used to provide increased braking torque.

Figure 4:
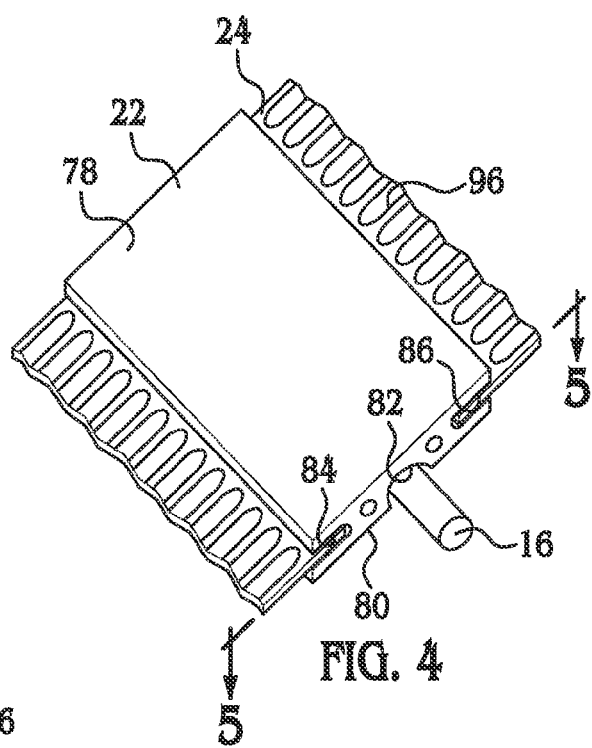
FIG. 4 is a perspective view of a portion of the brake of FIG. 1.
Figure 5:
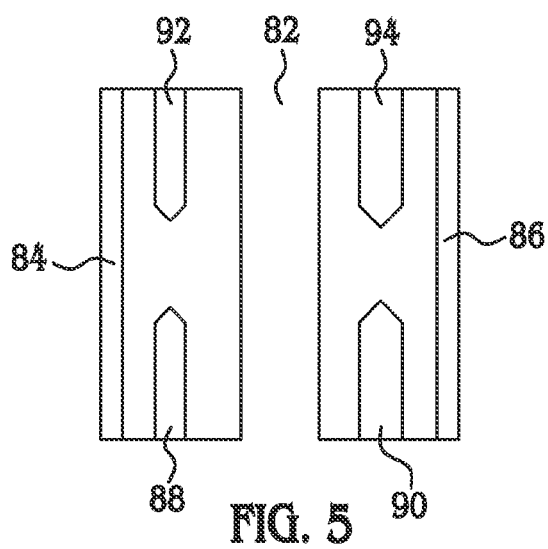
FIG. 5 is a cross-sectional view of a support column of the brake of FIG. 1.

Referring again to FIGS. 1 and 3, support columns 22 provide structural support to brake 10 and provide a means for absorbing braking forces during operation of brake 10. A column 22 may be disposed radially outwardly of each pin 16 and extends between end plates 26, 34. Although columns 22 are circumferentially spaced around brake 10 radially outwardly of corresponding pins 16, columns 22 are not necessarily rounded or curved. As shown in FIG. 4, in the illustrated embodiment, columns 22 are substantially rectangular in shape with radially inner and outer surfaces 78, 80 that are substantially flat. Columns 22 may be unitary (i.e., one piece) structures. The radially inner surface 80 of each column 22 defines a recess 82 configured to receive a corresponding pin 16, tabs 64 on friction plates 20A-D and springs 48. Columns 22 further include axially extending grooves 84, 86 at each circumferential end between surfaces 78, 80. Grooves 84, 86 are configured to receive corresponding circumferential ends of guards 24. Referring to FIG. 5, each column 22 may further defines axially extending closed bores 88, 90, 92, 94 formed in each axial end of column 22. Bores 88, 90, 92 94 are configured to receive fasteners such as bolts, screws, or pins used to fix column 22 to end plates 26, 34. Bores 88, 90, 92, 94, may be disposed circumferentially between recess 82 and a corresponding groove 84, 86. Bores 88, 92 and 90, 94, respectively, may be axially aligned. Although bolts or similar fasteners are used to secure columns 22 to end plates 26, 34 in the illustrated embodiment, it should be understood that other fasteners (e.g., welds) might be used and that columns 22 may be connected to end plates 26, 34, in a variety of ways. It should also be understood that columns 22 could be constructed and oriented so as to be disposed radially outwardly of more than one pin 16. The illustrated arrangement provides potentially greater reductions in weight, but larger columns could be used without departing from the spirit of the present invention.

Referring again to FIG. 4, guards 24 limit access to moving components of brake 10 to prevent damage to brake 10 from foreign objects or injuries to users. Guards 24 may be made from metals or metal alloys including steel. Guards 24 are spaced circumferentially around brake 10 between columns 22. Each circumferential end of a guard 24 is received within a corresponding groove 84, 86 of a column 22 and are slid into grooves 84, 86 from one axial end of brake 10. Guards 24 may be ventilated to allow dissipation of heat and reduce weight. In particular, each guard 24 may include a plurality of vents 96 extend longitudinally in a circumferential direction. It should be understood, however, that the number, size and shape of vents 96 may vary. Referring again to FIGS. 1 and 3, one or more guards 24 may also include apertures 98 sized to receive hoses and connectors through which fluid is provided to the inlets 76 and removed through the outlets of fluid jackets 70.

A brake in accordance with the present invention represents a significant improvement relative to conventional liquid cooled brakes. Columns 22 provide structural support and absorb braking forces during operation of brake 10 thereby removing undue strain on pins 16. In this manner, brake 10 is able to remove undue stress on pins 16 without the excessive weight resulting from the use of solid rings. Further, the columns can be used on brakes of varying diameters providing a scalable solution.

While the invention has been shown and described with reference to one or more particular embodiments thereof, it will be understood by those of skill in the art that various changes and modifications can be made without departing from the spirit and scope of the invention.

We claim:

1. A brake, comprising:
   first and second end plates configured to be disposed about a rotational axis of a driven shaft and said first and second end plates axially spaced from one another;
   a plurality of axially extending pins connecting said first and second end plates;
   a first friction plate configured to be coupled to said driven shaft for rotation therewith and axially movable relative to said driven shaft;
   a second friction plate defining a plurality of apertures through which said plurality of pins extend, said second friction plate fixed against rotation relative to said plurality of pins, but axially movable relative to said plurality of pins, said second friction plate defining a fluid jacket configured for passage of a fluid;
   a pressure plate configured for movement in a first axial direction towards said first and second friction plates; and,
   a first support column disposed radially outwardly of said second friction plate and extending between said first and second end plates.

2. The brake of claim 1, further comprising a second support column disposed radially outwardly of said second friction plate.

3. The brake of claim 2, further comprising a first guard connected to said first and second support columns, said first guard disposed circumferentially between said first and second support columns.

4. The brake of claim 3 wherein each of said first and second support columns includes an axially extending groove at one circumferential end, said axially ending grooves of said first and second support columns opening towards one another and configured to receive opposite circumferential ends of said first guard.

5. The brake of claim 3 wherein said first guard is ventilated.

6. The brake of claim 2 wherein said second support column is circumferentially spaced from said first support column.

7. The brake of claim 1 wherein said first support column is a unitary structure.

8. The brake of claim 1 wherein said first support column is disposed radially outwardly of a first pin of said plurality of pins.

9. The brake of claim 8 wherein said first support column is disposed radially outwardly of less than all of said plurality of pins.

10. The brake of claim 1 wherein said first support column is configured to receive a first pin of said plurality of pins.

11. The brake of claim 1 wherein said first support column is connected to said first and second end plates.

12. The brake of claim 1 wherein said first support column is fixed against movement relative to said first and second end plates.

13. The brake of claim 1 wherein said pressure plate is fixed against rotation relative to said plurality of pins, but axially movable relative to said plurality of pins.

14. The brake of claim 1 wherein a first pin of said plurality of pins extends through said pressure plate.

15. The brake of claim 1, further comprising a friction material disposed on each side of said first friction plate.

16. A brake, comprising:
   first and second end plates configured to be disposed about a rotational axis of a driven shaft and said first and second end plates axially spaced from one another;
   a plurality of axially extending pins connecting said first and second end plates;
   a first friction plate configured to be coupled to said driven shaft for rotation therewith and axially movable relative to said driven shaft;
   a second friction plate fixed against rotation relative to said plurality of pins, but axially movable relative to said plurality of pins, said second friction plate defining a fluid jacket configured for passage of a fluid;
   a pressure plate configured for movement in a first axial direction towards said first and second friction plates; and,
   a first support column disposed radially outwardly of said second friction plate and extending between said first and second end plates
   wherein said first support column defines first and second axially extending bores configured to receive fasteners fixing said first and second ends of said first support column to said first and second end plates.

17. A brake, comprising:
   first and second end plates configured to be disposed about a rotational axis of a driven shaft and said first and second end plates axially spaced from one another;
   a plurality of axially extending pins connecting said first and second end plates;
   a first friction plate configured to be coupled to said driven shaft for rotation therewith and axially movable relative to said driven shaft;
   a second friction plate fixed against rotation relative to said plurality of pins, but axially movable relative to said plurality of pins, said second friction plate defining a fluid jacket configured for passage of a fluid;
   a pressure plate configured for movement in a first axial direction towards said first and second friction plates; and,
   a first support column disposed radially outwardly of said second friction plate and extending between said first and second end plates
   wherein said second friction plate defines a plurality of radially outwardly extending tabs, each tab of said plurality of tabs configured to receive a corresponding pin of said plurality of pins.

18. A brake, comprising:
   first and second end plates configured to be disposed about a rotational axis of a driven shaft and said first and second end plates axially spaced from one another;
   a plurality of axially extending pins connecting said first and second end plates;
   a first friction plate configured to be coupled to said driven shaft for rotation therewith and axially movable relative to said driven shaft;
   a second friction plate defining a plurality of apertures through which said plurality of pins extend, said second friction plate fixed against rotation relative to said plurality of pins, but axially movable relative to said plurality of pins, said second friction plate defining a fluid jacket configured for passage of a fluid;
a pressure plate configured for movement in a first axial direction towards said first and second friction plates; and,
a plurality of circumferentially spaced support columns disposed radially outwardly of said second friction plate and extending between said first and second end plates, each of said plurality of support columns connected to said first and second end plates and fixed against movement relative to said first and second end plates.

19. A brake, comprising:
first and second end plates configured to be disposed about a rotational axis of a driven shaft and said first and second end plates axially spaced from one another;
a plurality of axially extending pins connecting said first and second end plates;
a first friction plate configured to be coupled to said driven shaft for rotation therewith and axially movable relative to said driven shaft;
a second friction plate fixed against rotation relative to said plurality of pins, but axially movable relative to said plurality of pins, said second friction plate defining a fluid jacket configured for passage of a fluid and defining a plurality of radially outwardly extending tabs, each tab of said plurality of tabs configured to receive a corresponding pin of said plurality of pins;
a friction material disposed on each side of said first friction plate;
a pressure plate defining a bore through which said first pin of said plurality of pins extends, said pressure plate fixed against rotation relative to said plurality of pins, but axially moveable relative to said plurality of pins and configured for movement in a first axial direction towards said first and second friction plates; and,
a plurality of circumferentially spaced support columns disposed radially outwardly of said second friction plate and extending between said first and second end plates, each of said plurality of support columns unitary in structure, connected to said first and second end plates and fixed against movement relative to said first and second end plates.

* * * * *